United States Patent
Morikawa

(10) Patent No.: US 7,456,987 B2
(45) Date of Patent: Nov. 25, 2008

(54) DIGITAL IMAGE FORMING APPARATUS

(75) Inventor: Hiroshi Morikawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 599 days.

(21) Appl. No.: 10/671,584

(22) Filed: Sep. 29, 2003

(65) Prior Publication Data

US 2004/0057077 A1    Mar. 25, 2004

Related U.S. Application Data

(63) Continuation of application No. 09/220,345, filed on Dec. 24, 1998, now Pat. No. 6,633,398.

(30) Foreign Application Priority Data

Dec. 26, 1997 (JP) ................................. 9-360937
Feb. 24, 1998 (JP) ............................... 10-042353

(51) Int. Cl.
*H04N 1/36* (2006.01)
*G06K 15/00* (2006.01)

(52) U.S. Cl. ................. 358/1.15; 358/421; 358/422

(58) Field of Classification Search .............. 358/1.3, 358/1.6, 1.15, 501, 502, 530, 401, 403, 406, 358/442, 443, 471, 436, 468, 400, 474, 504, 358/496, 506, 497, 437, 446, 422, 421, 1.14
See application file for complete search history.

(56) References Cited

U.S. PATENT DOCUMENTS

| | | | |
|---|---|---|---|
| 4,495,582 A | | 1/1985 | Dessert |
| 4,969,054 A | * | 11/1990 | Tsuji et al. ................. 358/473 |
| 5,231,516 A | * | 7/1993 | Kamon et al. .............. 358/449 |
| 5,280,369 A | | 1/1994 | Minamizawa |
| 5,327,526 A | * | 7/1994 | Nomura et al. ............ 358/1.16 |
| 5,517,316 A | * | 5/1996 | Hube ........................ 358/296 |
| 5,657,431 A | * | 8/1997 | Plakosh et al. ............ 358/1.16 |
| 5,669,040 A | | 9/1997 | Hisatake |
| 5,794,238 A | | 8/1998 | Gural |
| 5,918,988 A | * | 7/1999 | H.A.M. Van Oijen ......... 400/76 |

(Continued)

FOREIGN PATENT DOCUMENTS

EP     0469865     2/1992

(Continued)

OTHER PUBLICATIONS

Patent Abstracts of Japan, JP 09-185605, Jul. 15, 1997.

(Continued)

*Primary Examiner*—Jerome Grant, II
(74) *Attorney, Agent, or Firm*—Oblon, Spivak, McClelland, Maier & Neustadt, P.C.

(57) ABSTRACT

In a digital image forming apparatus, desired ones of different data stored in a hard disk are selected and given serial numbers in the order of selection. The data selected are linked and then output in any desired order without regard to the order in which they were written to the hard disk. The linked data are dealt with as a single job and printed on papers, OHP (Over Head Projector) films or similar recording media at a time. Further, the recording media may be stapled, punched or otherwise finished.

28 Claims, 7 Drawing Sheets

U.S. PATENT DOCUMENTS

| | | | |
|---|---|---|---|
| 5,930,577 | A | 7/1999 | Forsthoefel |
| 5,930,774 | A | 7/1999 | Chennault |
| 6,002,890 | A | 12/1999 | Jackson |
| 6,035,093 | A | 3/2000 | Kazami et al. |
| 6,181,436 | B1 | 1/2001 | Kurachi |
| 6,618,553 | B1 | 9/2003 | Shiohara |
| 6,633,398 | B1 * | 10/2003 | Morikawa .................. 358/1.15 |
| 6,646,754 | B1 * | 11/2003 | Redd et al. ................. 358/1.13 |
| 6,894,792 | B1 * | 5/2005 | Abe ......................... 358/1.15 |
| 6,934,046 | B1 * | 8/2005 | Nishikawa et al. ......... 358/1.15 |
| 6,943,866 | B2 * | 9/2005 | Redd et al. .................... 355/40 |
| 2001/0011288 | A1 | 8/2001 | Mastie |
| 2001/0012124 | A1 | 8/2001 | Morikawa |
| 2002/0057452 | A1 * | 5/2002 | Yoshino .................... 358/1.15 |
| 2002/0063900 | A1 * | 5/2002 | Fredlund et al. ............. 358/302 |
| 2003/0065531 | A1 * | 4/2003 | Satomi et al. ................... 705/1 |
| 2003/0160995 | A1 * | 8/2003 | Oka et al. .................. 358/1.15 |
| 2003/0184802 | A1 * | 10/2003 | Morikawa .................. 358/1.16 |
| 2004/0057077 | A1 | 3/2004 | Morikawa |
| 2004/0109147 | A1 * | 6/2004 | Redd et al. ..................... 355/40 |
| 2004/0120003 | A1 * | 6/2004 | Barry et al. ................. 358/1.15 |
| 2006/0164685 | A1 * | 7/2006 | Kobayashi ................. 358/1.18 |

FOREIGN PATENT DOCUMENTS

| | | | |
|---|---|---|---|
| EP | 469865 A2 * | 2/1992 | |
| EP | 0469865 A2 * | 2/1992 | |
| JP | 62-249562 | 10/1987 | |
| JP | 63-208157 | 8/1988 | |
| JP | 64-11233 | 1/1989 | |
| JP | 04-252566 | 9/1992 | |
| JP | 4-306061 | 10/1992 | |
| JP | 406131153 | 5/1994 | |
| JP | 06-251014 | 9/1994 | |
| JP | 07-283896 | 10/1995 | |
| JP | 8-238825 | 9/1996 | |
| JP | 9-185605 | 7/1997 | |
| JP | 10-512406 | 11/1998 | |
| WO | WO 96/18142 | 6/1996 | |

OTHER PUBLICATIONS

Patent Abstracts of Japan, 11-129586, May 18, 1999.
Patent Abstracts of Japan, 11-105384, Apr. 20, 1999.
Patent Abstracts of Japan, 10-143342, May 29, 1998.
Patent Abstracts of Japan, JP 96-18142 (JP-10-512406), (a copy will be filed later).
U.S. Appl. No. 10/383,513, filed Mar. 10, 2003, Morikawa.
U.S. Appl. No. 10/671,584, filed Sep. 29, 2003, Morikawa.
U.S. Appl. No. 11/299,903, filed Dec. 13, 2005, Morikawa.

* cited by examiner

DIGITAL IMAGE FORMING APPARATUS

This application is a Continuation of application Ser. No. 09/220,345 filed on Dec. 24, 1998.

BACKGROUND OF THE INVENTION

The present invention relates to a copier, facsimile apparatus, printer or similar image forming apparatus and more particularly to a digital image forming apparatus.

A copier, printer, facsimile apparatus or similar image forming apparatus capable of forming images in accordance with digital image data is conventional. A current trend in the imaging art is toward a digital image forming apparatus including a memory, hard disk or similar storage for dealing with a great amount of data or for implementing versatile functions. The storage allows, e.g., a facsimile apparatus to receive data even when the apparatus runs out of paper or allows a copier to rotate, when a document and a paper to be deal are different in orientation, its image forming device on the basis of the orientation of the paper.

However, the conventional digital image forming apparatus with the above storage processes each data stored in the storage as independent data and does not link or otherwise associate them together. Although a combination copy mode is available with a modern digital copier for associating a plurality of different data, it simply writes data representative of two documents in the storage and then prints them out while superposing images. This brings about a problem that when images are present at the same positions on two documents, they are superposed on each other and render the resulting copy unusable.

SUMMARY OF THE INVENTION

It is therefore an object of the present invention to provide a digital image forming apparatus capable of linking a plurality of different data by making the most of the merit of a storage, and thereby implementing more convenient and more versatile functions.

In accordance with the present invention, in a digital image forming apparatus including a storage for storing data, a plurality of data stored in the storage are capable of being processed by being linked to each other in a desired order.

BRIEF DESCRIPTION OF THE DRAWINGS

The above and other objects, features and advantages of the present invention will become more apparent from the following detailed description taken with the accompanying drawings in which:

While FIGS. 3, 4 and 5 show various information appearing on the screen in Japanese, the information may, of course, be displayed in any other language.

DESCRIPTION OF THE PREFERRED EMBODIMENTS

Figure 1:
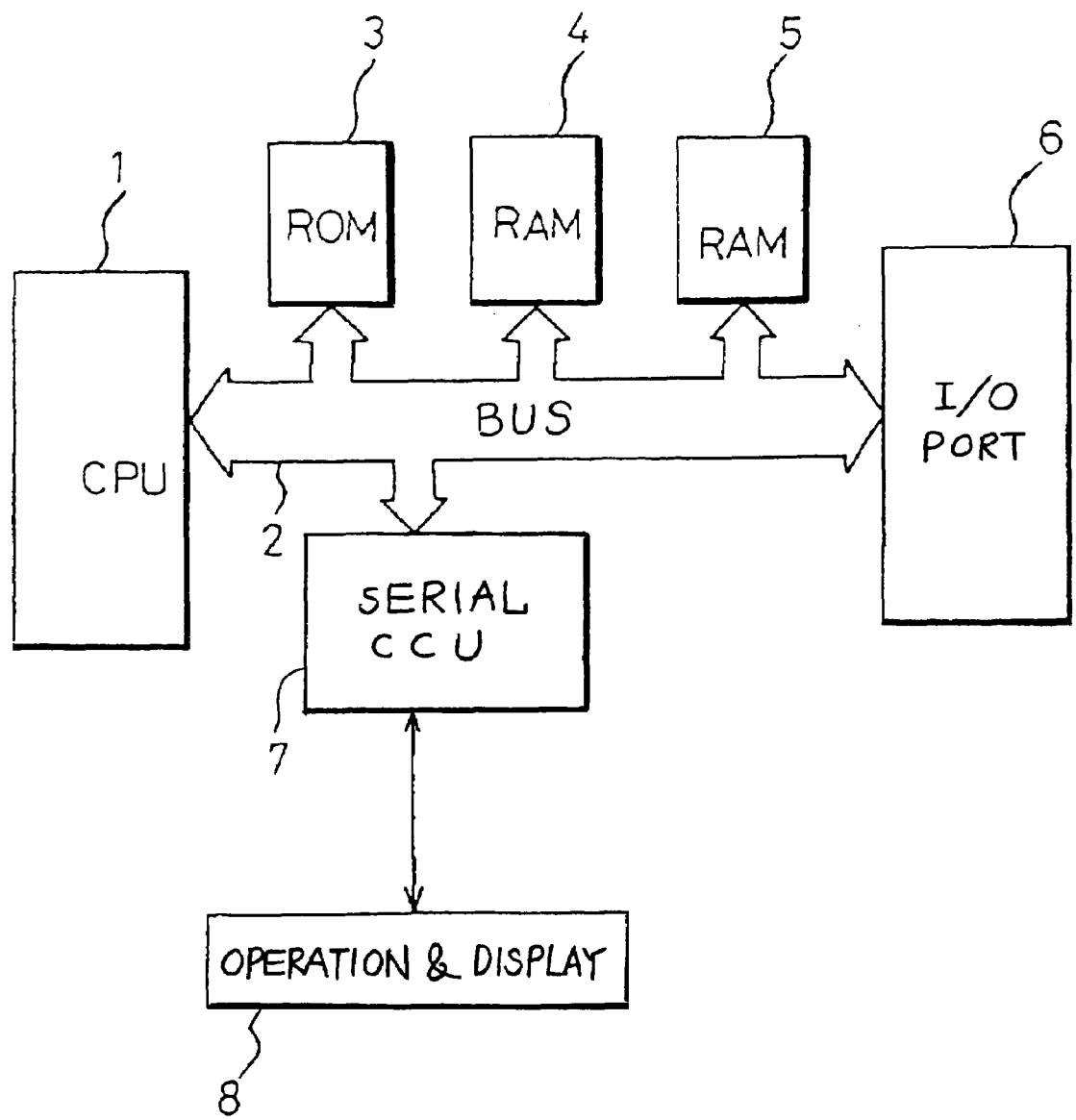
FIG. 1 is a block diagram schematically showing a control system included in a digital image forming apparatus embodying the present invention.

Referring to FIG. 1 of the drawings, a control system included in a digital image forming apparatus embodying the present invention is shown. The image forming apparatus to be described is identical with the conventional electrophotographic image forming apparatus as to the general construction including a document scanning section, an image forming section, and a paper feeding section. The following description will therefore concentrate on features unique to the illustrative embodiment. While the illustrative embodiment may be implemented as a copier, facsimile apparatus or a printer or a combination thereof, it is assumed to be a combined copier/printer.

As shown in FIG. 1, the control system includes a microprocessor 1 for executing a program assigned to the apparatus. An address, data and control bus 2 connects the microprocessor 1 to a ROM (Read Only Memory) 3, a RAM (Random Access Memory) 4, a nonvolatile RAM (NVRAM) 5, an I/O (Input/Output) port 6, and a serial CCU (Communication Control Unit). The I/O port 6 is connected to motors, solenoids and other output loads and sensors, not shown, included in the apparatus. The serial CCU 7 interchanges signals with an operation and display panel 8.

Figure 2:
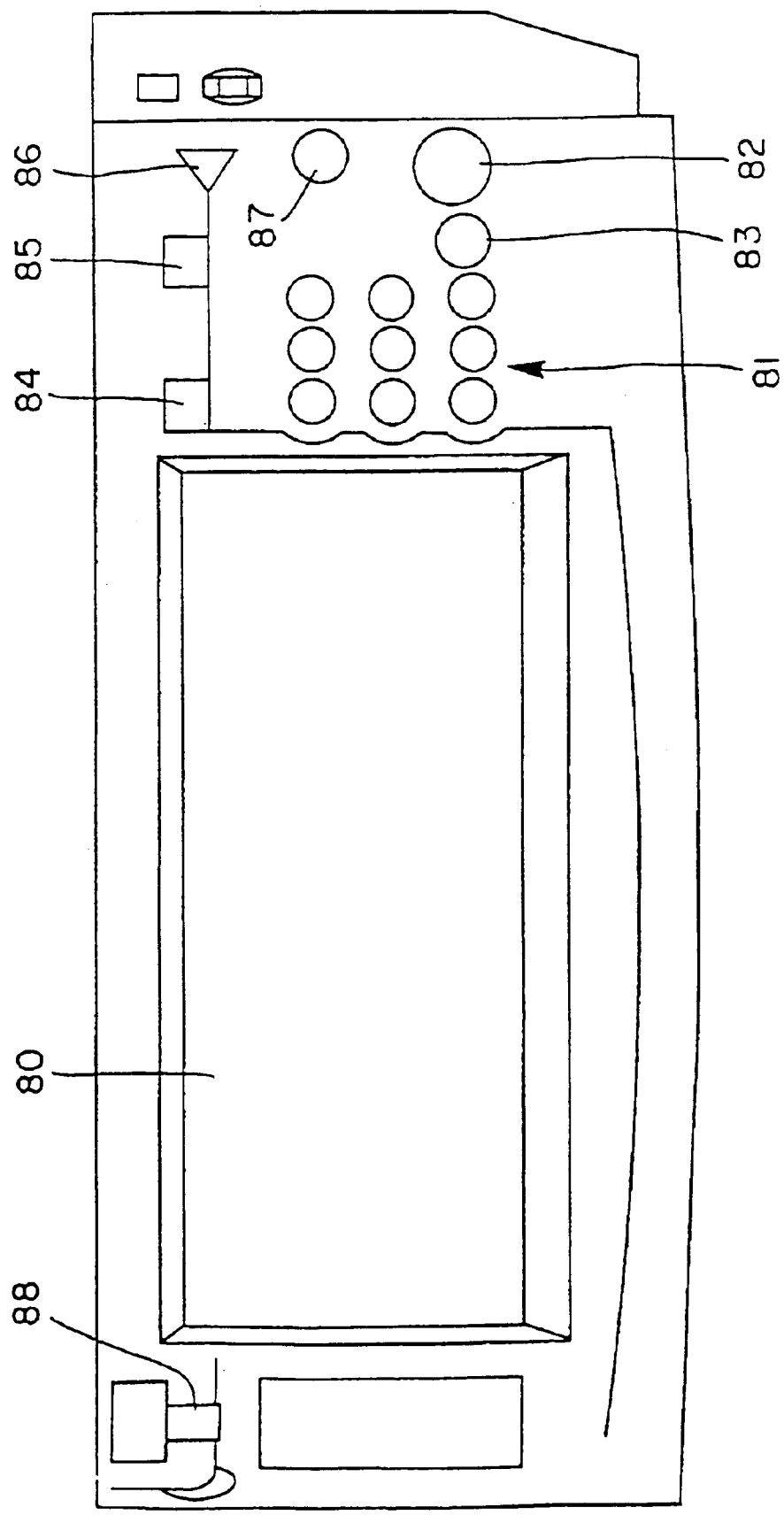
FIG. 2 is a plan view showing a specific configuration of an operation and display pan I included in the illustrative embodiment.

FIG. 2 shows a specific configuration of the operation and display panel 8. As shown, the panel 8 includes a screen 80. Arranged around the screen 80 are numeral keys (enter keys) 81, a start key 82, a clear/stop key 83, a program key 84, a reset/preheat key 85, an interrupt key 86, a trial copy key 87, and a set key 88.

Statuses and messages appear on the screen 80 during the operation of the apparatus. The numeral keys (enter keys) 81 bifunction as numeral keys for allowing the operator to input a desired number of copies or similar numerical value and enter keys for allowing the operator to fix the input numerical value. The start key 82 causes the apparatus to start a copying operation when pressed. The clear/stop key 83 is used to cancel the input numerical value or to interrupt or end the copying. The program key 84 is used to register or call settings of frequent use. The reset/preheat key 85 is used to reset contents set or to preheat the apparatus; a preheat mode is set up when the key 85 is continuously pressed for more than about 1 second. The trial copy key 87 allows a single trial copy to be produced, so that the operator can see the quality of the copy. The set key 88 is used to change initial set values and operating conditions in accordance with the conditions of use.

The screen 80 is implemented by an LCD (Liquid Crystal Display) with a touch panel. Circuitry for detecting touch panel keys and a coordinates detecting method are conventional and will not be described specifically.

Figure 3:
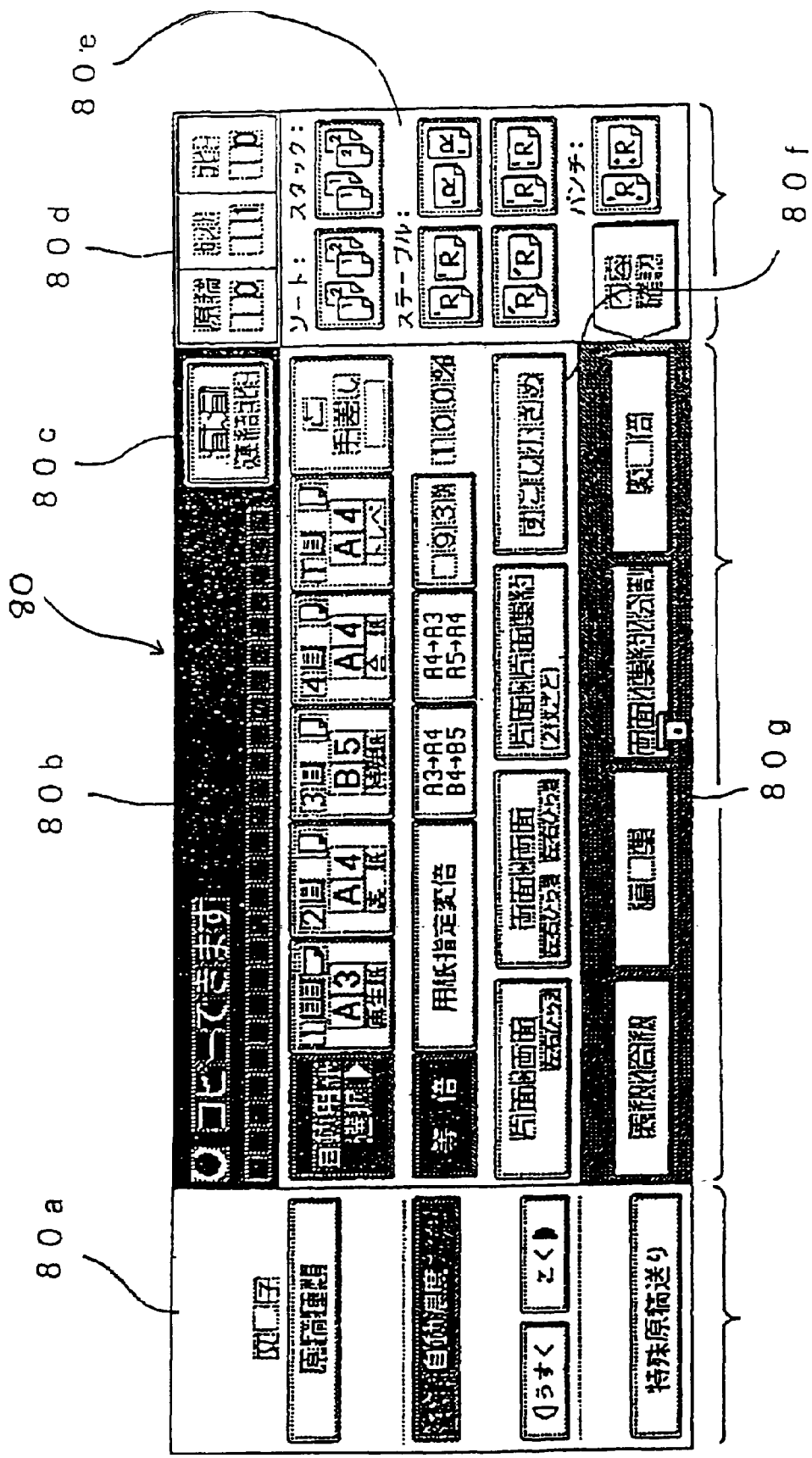
FIG. 3 is a plan view showing a basic picture initially appearing on the screen of the operation and display panel during copy mode operation.

FIG. 3 shows an initial or standard picture to appear on the screen 80 when the apparatus is used as a copier. As shown, the initial picture includes display areas 80*a*-80*g*. The display area 80*a* displays information allowing the operator to select the kind of documents, copy density, and special document feed. The display area 80*b* displays operating statuses and messages. The display area 80c displays linked copying when a desired unit is connected to the apparatus or displays the remaining capacity of a memory when such a unit is not connected to the apparatus. The display area 80d displays the number of documents written to the memory, the number of documents (sets) set, and the number of documents (sets) copied. The display area 80e displays information allowing the operator to select a sort mode, a stack mode or a punch mode. The display area 80f displays the contents of registering functions. The display area 80g displays a magnification changing function, an editing function and other functions available with the apparatus.

From the copying operation standpoint, the screen 80 consists of a first display section (display area 80a) relating to the handling of documents, a second display section relating to the configuration of copies including a paper size and a magnification change, and a third display section (display area 80e) relating to finishing. It is to be noted that the display area 80d for showing numbers relating to documents does not suit with the above classification and is excluded from the classification. Also, the first to third display sections are simply illustrative and may overlap each other.

Figure 4:
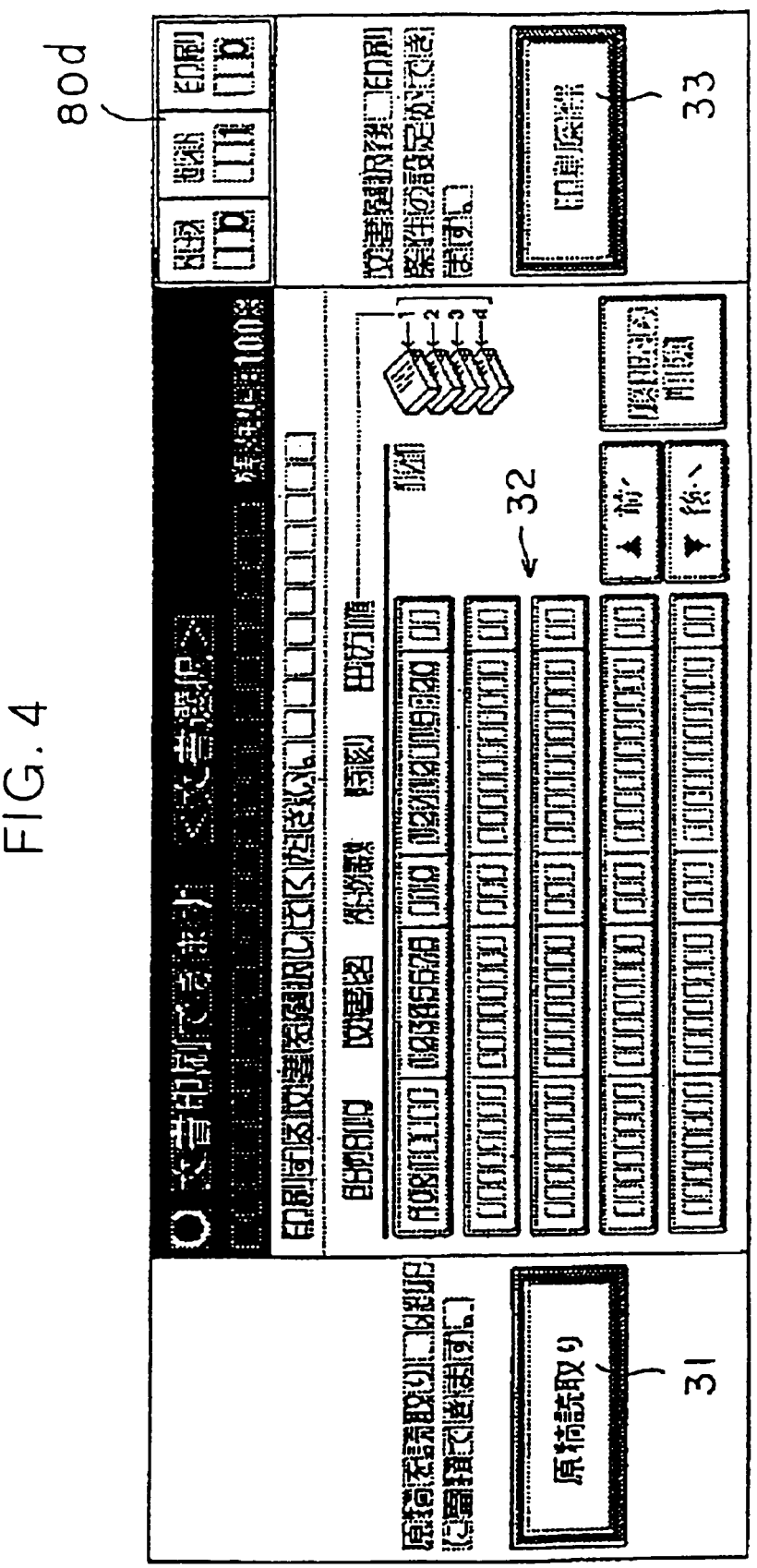
FIG. 4 is a plan view showing a document selection picture appearing in a stored file print mode.

FIG. 4 shows a specific document selection picture appearing on the screen 80 when a stored file print mode is selected. The stored file print mode is selected on a host machine connected to the copier in order to print data (files) stored in a data storage. Basically, this operation mode belongs to the printer function. In the illustrative embodiment, the above data storage is implemented by a hard disk included in the copier/printer.

In the picture shown in FIG. 4, the first display section shows a document read key 31 for inputting a document read command. In the second display section, a message display area positioned at the top is similar to the display area 80b of FIG. 3 (although the content is different). A stored data display area 32 is positioned below the above message display area and capable of displaying up to five different data stored in the data storage. Specifically, the display area 32 is capable of displaying a user ID (identification), a document name, the number of pages, a time and an output order data by data. In the specific condition shown in FIG. 4, information relating to data appears on the top column of the display area 32, showing that one data is present in the data storage.

The third display section is located at the right portion of the screen 80. In the third display section, a print condition key 33 is displayed in order to allow the operator to select desired printing conditions. The display area 80d for showing numbers relating to documents is positioned at the top of the third displays section, as in the picture of FIG. 3.

Figure 5:
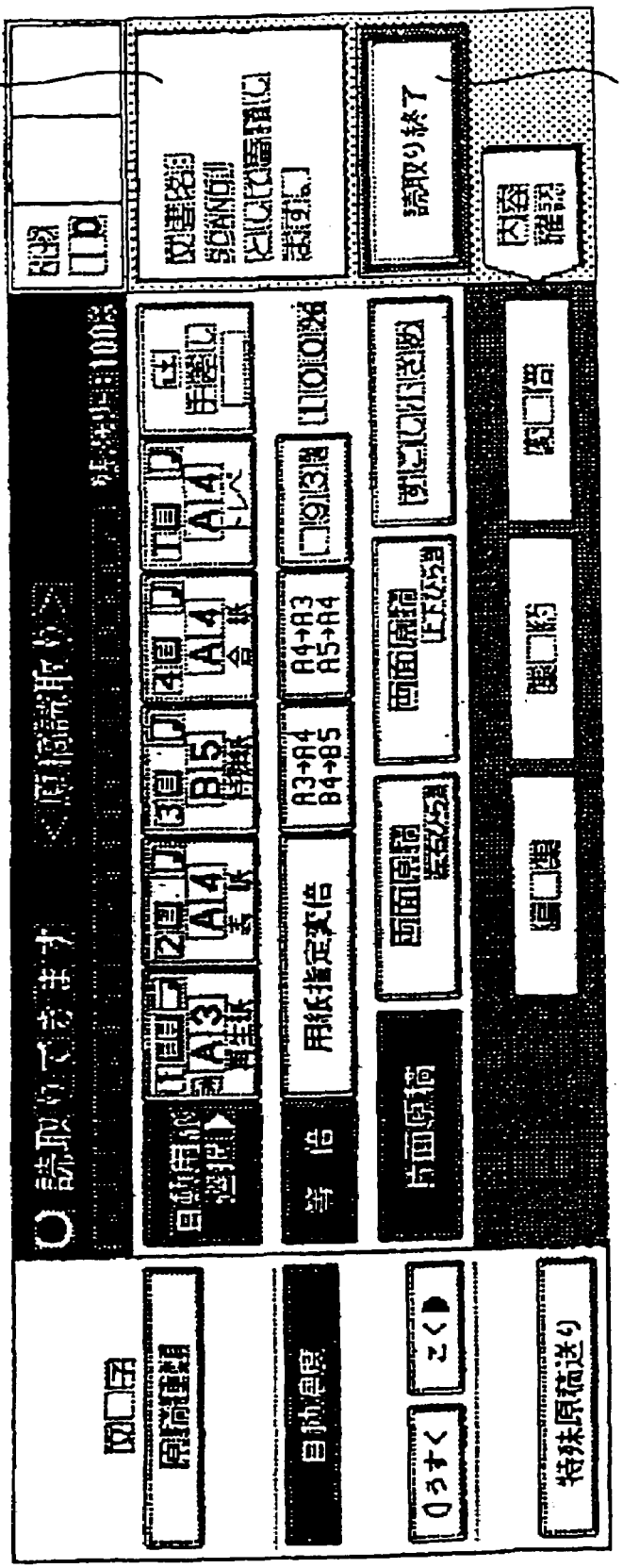
FIG. 5 is a plan view showing a picture for allowing data read to be stored.

To merge, e.g., a paper-base reference with stored document data, the operator touches the document read key 31 in the picture shown in FIG. 4. Then, a document read picture shown in FIG. 5 appears in place of the picture of FIG. 4. After the operator has input necessary information in the picture of FIG. 5, the copier/printer reads the above reference and writes the resulting data in the hard disk.

Figure 6:
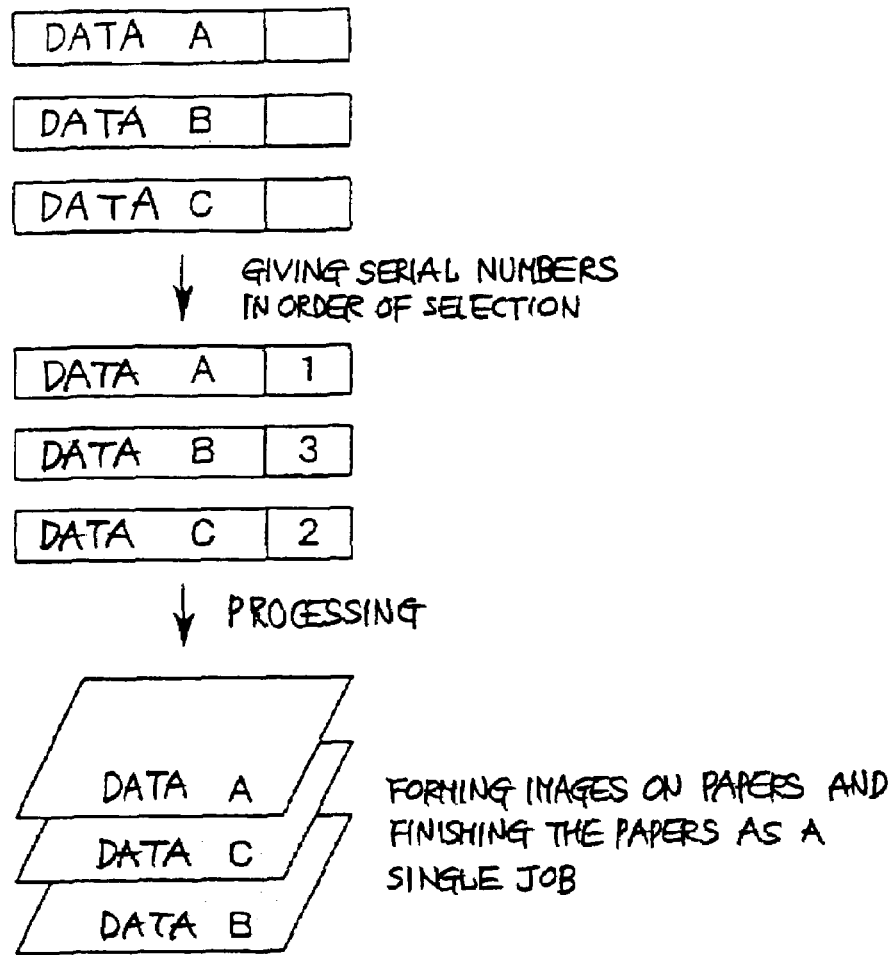
FIG. 6 demonstrates how the illustrative embodiment links a plurality of data.

The illustrative embodiment is capable of linking a plurality of data stored in the data storage in any desired order and handling them as a single job. FIG. 6 demonstrates such a concept specifically. In the illustrative embodiment, when the operator inputs a desired data output order in the picture of FIG. 4, the data can be output in the desired order without regard to the order in which the data were written to the data storage. The linked data to be dealt with as a single job may be sequentially printed on, e. g., papers or OHP (Over Head Projector) films and then stapled, punched or otherwise finished. The data to be linked include even document files and image data generated by the host machine and paper-base documents, references, drawings and photos read by the copier/printer.

Figure 7:
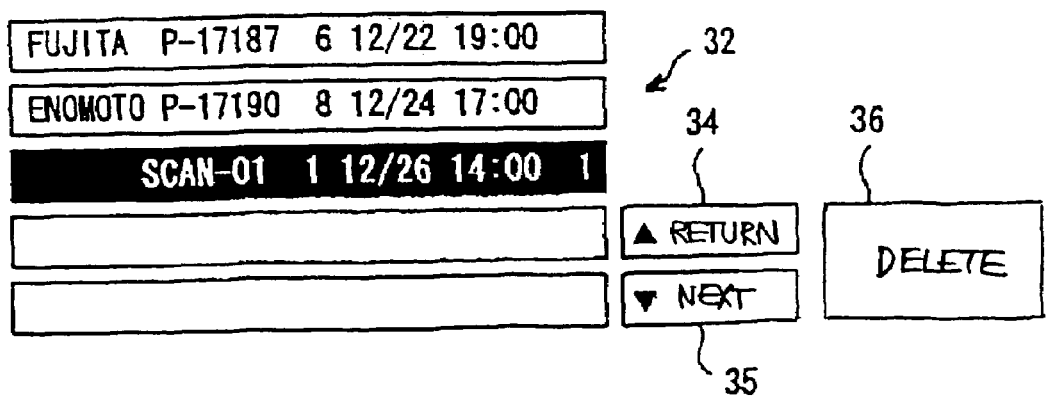
FIG. 7 shows a part of the document selection picture relating to stored data.

A specific operation will be described in relation to the screen 80 of the operation and display panel 8. FIG. 7 shows a part of the picture of FIG. 4 relating to the data stored in the hard disk. As shown, three different data "P17187", "P-17190" and "SCAN-01" are assumed to be stored in the hard disk. The data "P-17187" and "P-17190" are document data output form the host machine while the data "SCAN-01" is image data read by the copier/printer. These data are displayed on the screen 80 in the order in which they were written to the hard disk. That is, the top data "P-17187" is the oldest data while the bottom data "SCAN-01" is the newest data (see the dates and times of storage).

While the maximum number of data that can be displayed on the screen 80 at a time is assumed to be five, six or more data can, of course, be stored in the hard disk. When six or more data are stored in the hard disk, use is made of scroll keys 34 and 35. For example, assume that eight data are registered at the hard disk. Then, the operator watching the first to fifth data, as counted from the oldest one, on the screen 80 may touch the key 35 label d "Next" in order to see the sixth data and successive data. To see the preceding data (registered previously), the operator may touch the key 34 labeled "Return". To delete any one of the data, the operator may select the data to delete and then touch a key 36 labeled "Delete".

Figure 8:
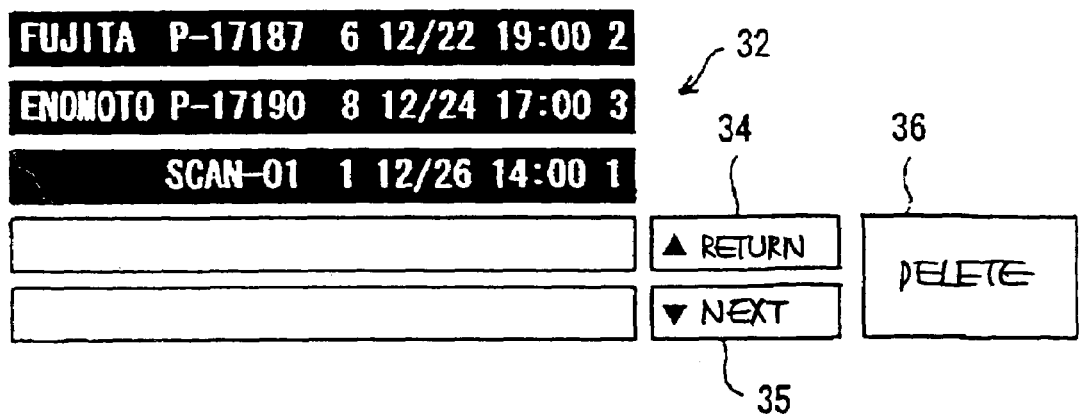
FIG. 8 shows a specific condition wherein stored data are selected and given a desired output order.

The output order of the data is determined by the order in which the operator selects the data on the screen 80. Specifically, FIG. 7 shows a condition wherein the operator has selected the data "SCAN-01" first; the data"SCAN-01" is highlighted with a serial number "1" appearing at the right-hand side of the data. FIG. 8 shows a specific condition wherein the operator has selected the data "P-17187" and "P-17190" in this order after the data "SCAN-01"; serial numbers "2" and "3" are shown at the right-hand side of such data. As a result, the data "SCAN-01", "P-17187" and "P-17190" will be sequentially output in this order.

When the operator selected the data in the condition shown in FIG. 8 touches the print condition key of the third display section, FIG. 4, a picture showing various print conditions appears on the screen 80. The operator may select stapling, punching or similar finishing in the picture. Subsequently, the operator inputs a desired number of copies or sets of copies on the numeral keys 81, FIG. 2, and then presses the start key 82.

To change or cancel the output order selected, the operator again touches the data or presses the mode clear key 83, FIG. 2. For example, assume that the operator selected the data "SCAN-01" first (serial number "1") change the output order to "P-17187", "SCAN-01" and "P-17190" (serial numbers "1", "2" and "3", respectively). Then, the operator again touches "SCAN-01" to cancel it ("1" disappears), touches "P-17187" to select it ("1" appears), touches "SCAN-01" to select it ("2" appears), and touches "P-17190" to select it ("3" appears).

As stated above, the illustrative embodiment is capable of linking a plurality of documents (data) stored in the hard disk and handling them as a single job. It is therefore possible to make the most of the merit of storing means and implement more convenient and more versatile functions.

The data to be handled as a single job are not limited to document data, but may even be image data output from, e.g., a personal computer or data read out of paper-base documents, references, drawings, etc. The hard disk shown and described as playing the role of storing means may, of course, be replaced with a semiconductor memory, DVD (Digital VideoDisk) RAM or similar memory.

The illustrative embodiment has concentrated on a multiplex machine in the form of a printer/copier. The present invention is similarly practicable with any one of or any other combination of a copier, a printer or a facsimile apparatus. For example, in a combined copier/facsimile/printer machine, the present invention is capable of linking received data and documents, references or similar document files.

Another procedure for allowing the operator to select the output order of a plurality of data and representative of an alternative embodiment of the present invention is as follows. In FIG. 7, three data are stored in the hard disk. To change the output order of the stored data, the operator uses either one of the keys 34 and 35. To delete needless data, the operator uses the key 36. For example, when two of five stored data are needless, the operator selects them and touches the key 36 in order to delete them.

In FIG. 7, the data "SCAN-01" is highlighted. To give the data "SCAN-01" the serial number "2", the operator touches the key 34. As a result, as shown in FIG. 9, the data "SCAN-01" is brought to a position between the data "P-17190 and the data "P-17191" while new serial numbers are displayed at the right-hand-side of the three data.

Figure 9:
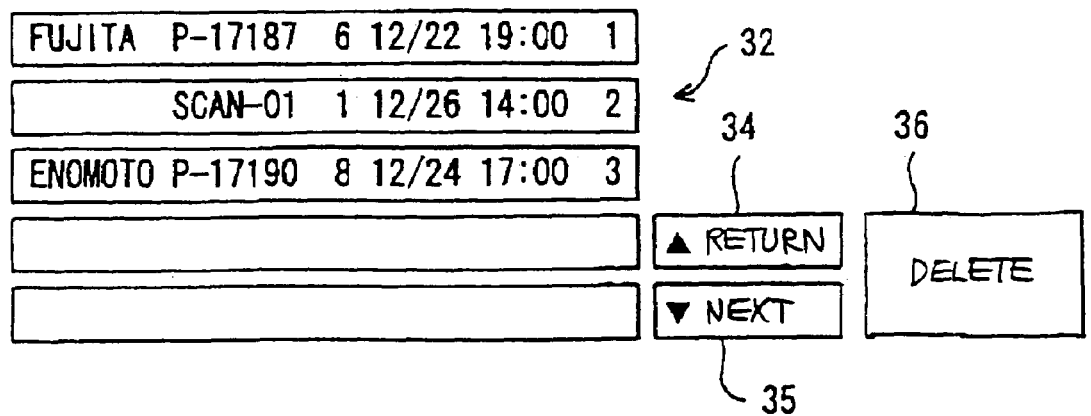
FIG. 9 shows an alternative embodiment of the present invention.

To output the data in the order shown in FIG. 9, the operator selects all of the three data in the picture by touching them. Subsequently, the operator touches the print condition key 33, FIG. 4, in order to see the picture showing various printing conditions. The operator may select stapling, punching or similar finishing in the same picture. The operator inputs desired printing conditions, then inputs a desired number of copies on the numeral keys 81, and then presses the start key 82.

In summary, it will be seen that the present invention provides a digital image forming apparatus having various unprecedented advantages, as enumerated below.

(1) The apparatus is capable of linking a plurality of documents (data) stored in a storage and handling them as a single job. It is therefore possible to make the most of the merit of the storage and implement more convenient and more versatile functions.

(2) Only desired ones of data stored in the storage can be selected and processed.

(3) When the data to be linked include image data produced beforehand, a high quality file with the image data added to document data is achievable.

(4) When the data to be linked include image data read by an image scanning function, a paper-base reference, for example, can be easily combined with a document. This further enhances the quality of a file.

(5) When the linking operation includes finishing for finishing recording media, it is possible to save time and labor necessary for finishing and therefore to enhance productivity.

Various modifications will become possible for those skilled in the art after receiving the teachings of the present disclosure without departing from the scope thereof.

What is claimed is:

1. A method of printing data files using an image printing device, comprising:
   storing data files in a storage device associated with the image printing device;
   selecting, in an arbitrary order, a plurality of the data files stored in the storage device;
   displaying a serial number indicating the selected printing order of the selected plurality of data files; and
   printing the selected plurality of data files, wherein the plurality of data files are printed in the selected order.

2. The method of claim 1, further comprising:
   selecting a number of copies of each of the plurality of data files to be printed.

3. The method of claim 1, further comprising:
   obtaining the plurality of data files by scanning, wherein the plurality of data files include at least one of image data and document data.

4. The method of claim 1, wherein the selecting steps are performed by a user through interaction with an operation and display panel.

5. The method of claim 1, wherein the selected arbitrary order of the plurality of data files is unrelated to an order in which the data files were stored in the storage device.

6. The method of claim 1, further comprising:
   selecting at least one print condition including selecting at least one of stapling and punching.

7. The method of claim 1, wherein the data files stored in the storage device include data from a host machine and data from a scanner.

8. The method of claim 7, further comprising:
   displaying an indication of whether the data files stored in the storage device are from the host machine or from the scanner.

9. The method of claim 1, wherein the displaying step comprises displaying a file name, in addition to the serial number, for each of the selected plurality of data files.

10. An image printing device, comprising:
    a storage device configured to store data files;
    a selection device configured to select, in an arbitrary order, a plurality of the data files stored in the storage device, and to display a serial number indicating the selected printing order of the selected plurality of data files; and
    a printing device configured to print the selected plurality of data files, wherein the plurality of data files are printed in the selected order.

11. The image printing device of claim 10, further comprising:
    another selection device configured to select a number of copies of each of the plurality of data files to be printed.

12. The image printing device of claim 10, further comprising:
    a scanning device configured to obtain the plurality of data files by scanning, wherein the plurality of data files include at least one of image data and document data.

13. The image printing device of claim 10, wherein the selection device includes an operation and display panel configured to be operated by a user.

14. The image printing device of claim 10, wherein the selection device is configured to select the plurality of data files independently of an order in which the data files were stored in the storage device.

15. The image printing device of claim 10, wherein the selection device is configured to select at least one print condition including at least one of stapling and punching.

16. The image printing device of claim 10, wherein the storage device is configured to store data from a host machine and data from a scanner.

17. The image printing device of claim 16, wherein the selection device is configured to display an indication of whether the data files stored in the storage device are from the host machine or from the scanner.

18. The image printing device of claim 10, wherein the selection device is configured to select the arbitrary order such that the selected arbitrary order of the plurality of data files is unrelated to an order in which the data files were stored in the storage device.

19. The image printing device of claim 10, wherein the selection device is configured to display a file name, in addition to the serial number, for each of the selected plurality of data files.

20. A computer program product stored on a computer readable medium, the computer program product including instructions configured to cause an image printing device to print data files by performing the steps of:

storing data files in a storage device associated with the image printing device;

selecting, in an arbitrary order, a plurality of the data files stored in the storage device;

displaying a serial number indicating the selected printing order of the selected plurality of data files; and printing the selected plurality of data files, wherein the plurality of data files are printed in the selected order.

21. The computer program product of claim 20, further comprising:

instructions for selecting a number of copies of each of the plurality of data files to be printed.

22. The computer program product of claim 20, further comprising:

instructions for obtaining the plurality of data files by scanning, wherein the plurality of data files include at least one of image data and document data.

23. The computer program product of claim 20, wherein the selecting steps are performed by a user through interaction with an operation and display panel.

24. The computer program product of claim 20, wherein the selected arbitrary order of the plurality of data files is unrelated to an order in which the data files were stored in the storage device.

25. The computer program product of claim 20, wherein the data files stored in the storage device include data from a host machine and data from a scanner.

26. The computer program product of claim 25, further comprising:

displaying an indication of whether the data files stored in the storage device are from the host machine or from the scanner.

27. The computer program product of claim 20, wherein the selected arbitrary order of the plurality of data files is unrelated to an order in which the data files were stored in the storage device.

28. The computer program product of claim 20, wherein the displaying step comprises displaying a file name, in addition to the serial number, for each of the selected plurality of data files.

* * * * *